United States Patent [19]

Brown et al.

[11] Patent Number: 5,609,275
[45] Date of Patent: Mar. 11, 1997

[54] METERING APPARATUS HAVING A SCREW MEMBER

[75] Inventors: Robert L. Brown, Hartville; William H. Miller, Wadsworth; David E. Baxter, Ravenna, all of Ohio

[73] Assignee: GenCorp Inc., Fairlawn, Ohio

[21] Appl. No.: 422,746

[22] Filed: Apr. 14, 1995

Related U.S. Application Data

[63] Continuation of Ser. No. 80,021, Jun. 21, 1993, abandoned.

[51] Int. Cl.[6] .................................................. G01F 11/20
[52] U.S. Cl. ........................................................... 222/413
[58] Field of Search .................................. 222/282, 285, 222/286, 290, 311, 314, 334, 626, 413, 236; 366/79, 89, 81, 83, 92, 343; 425/376.1; 198/671, 670

[56] References Cited

U.S. PATENT DOCUMENTS

| | | | |
|---|---|---|---|
| 1,520,669 | 12/1924 | Ziegner | 222/311 |
| 1,828,317 | 10/1931 | Clapp | 222/108 |
| 1,908,117 | 5/1933 | Clapp et al. | 222/318 |
| 2,908,425 | 10/1959 | Denson | 222/262 |
| 3,368,724 | 2/1968 | Peters et al. | 222/413 |
| 3,383,015 | 5/1968 | Miler | 222/413 |
| 3,411,213 | 11/1968 | Spinello | 222/413 |
| 3,729,280 | 4/1973 | Hehl | 222/413 |
| 3,750,905 | 8/1973 | Wolfrom | 222/23 |
| 3,888,388 | 6/1975 | Mahoney | 222/413 |
| 4,105,147 | 8/1978 | Stubbe | 222/413 |
| 4,125,208 | 11/1978 | Betterman | 222/236 |
| 4,133,460 | 1/1979 | Jerpbak | 222/413 |
| 4,277,182 | 7/1981 | Kruder | 366/89 |
| 4,773,354 | 9/1988 | Wilbur | 222/513 |
| 4,955,721 | 9/1990 | Clark et al. | 366/79 |
| 5,005,731 | 4/1991 | Koehler et al. | 222/54 |

*Primary Examiner*—Gregory L. Huson
*Assistant Examiner*—Philippe Derakshani
*Attorney, Agent, or Firm*—Robert F. Rywalski; Jeanne E. Longmuir

[57] ABSTRACT

A metering apparatus 10 for continuously supplying a specified amount of fluid material F to a desired surface. The apparatus 10 includes a reservoir 14 for maintaining a supply of fluid material, a housing 16 having a central bore 22 therethrough, a receiving opening 24 for receiving fluid material from the reservoir 14 to central bore 22, and an exit opening 26 through which fluid material exits the housing 16. A rotatable screw member 28 is provided engaged through the housing 16 within said central bore 22, and a driver 37 engaged with the screw member for rotating the screw member within the bore at between approximately 1 rpm to 2,700 rpm, and preferably approximately 1,750 rpm, in order to continuously supply fluid to the exit opening 26. At this operating level, fluid material is provided from the exit opening 26 at a flow rate of between approximately 1 to 23 grams/min, and in a thickness of approximately 0.001 to 8 mils. The reservoir 14 includes a tank 50 for the fluid material, and a motor 68 for agitating the fluid during operation of the apparatus 10. The housing 16 is secured adjacent the tank 50 to provide the fluid material from the tank to the receiving opening 24.

11 Claims, 10 Drawing Sheets

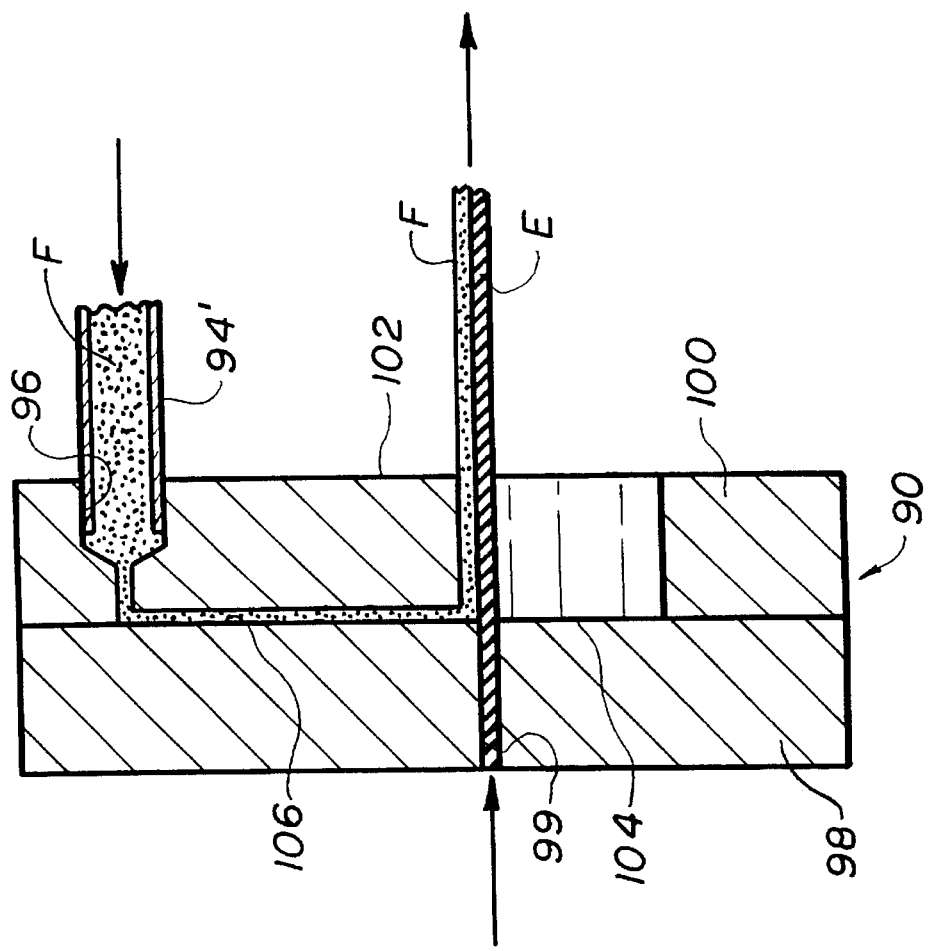
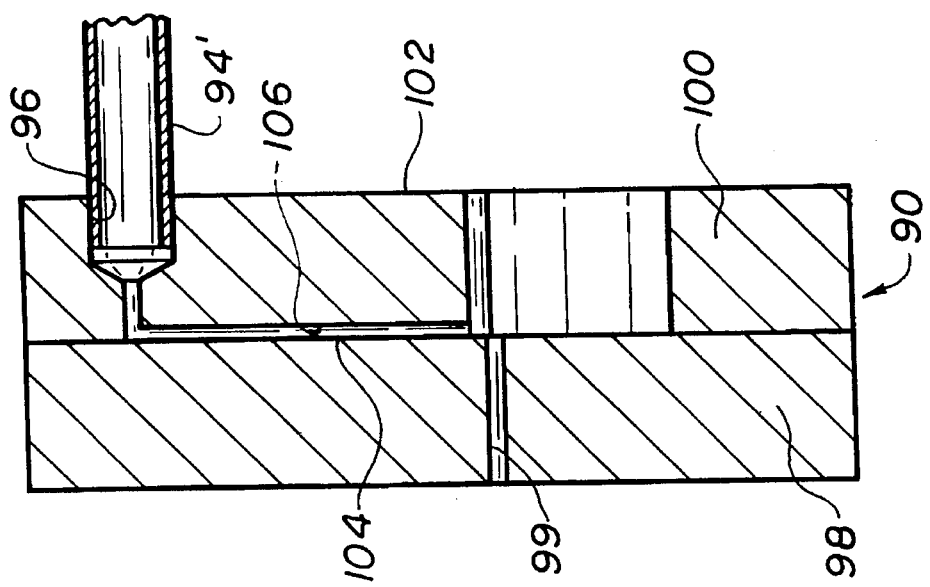

METERING APPARATUS HAVING A SCREW MEMBER

This is a continuation of application Ser. No. 08/080,021 filed Jun. 21, 1993, now abandoned.

TECHNICAL FIELD

The present invention relates to an apparatus for metering fluid material, and more particularly to an apparatus for continuously supplying a regulated or specified amount of fluid material from a reservoir for use on a desired surface.

BACKGROUND OF THE INVENTION

Metering devices or metering pumps which are currently available for supplying fluid material in a specified amount typically supply the fluid material in spurts or a series of injections, rather than continuously. The application of material in such a discontinuous fashion is a disadvantage in that the material being applied by the device to the desired surface may be uneven. Additionally, such metering pumps are often large, and difficult to use in a small manufacturing space. The large size of such devices also results in their relative high cost.

Conventional metering devices for fluid material have the further disadvantage that they do not reliably provide a specific amount of material at the desired location. Such conventional devices often provide material in a pulsed flow, instead of a continuous flow. For example, it may be desirable to have a specific thickness of material applied to ensure a desired use or result from the material. The failure of such devices to provide a regulated and continuous amount of material may result in increased waste of the material being applied, as well as waste of the item to which the fluid material is applied. The failure to apply specific amounts of material is often due to a clog or plug of material which may form within the device and result in improper performance, or the pulsing application referred to.

Additionally, special metering conditions often require the application of different fluid materials having variable viscosities or materials with unusual rheological characteristics. Dispensing such materials at low or variable flow rates on a consistent basis has not been possible using one conventional metering device. Typically, separate metering devices are used to apply each of the different viscosity fluid materials. The additional complication of providing such fluid materials in small, but specified amounts, has also not been readily possible using a single currently available metering device.

SUMMARY OF THE INVENTION

The present invention provides a new and improved metering apparatus which continuously supplies a specified amount of fluid material from a reservoir to a desired surface. The apparatus preferably includes a metering pump subassembly and a reservoir subassembly. The metering pump subassembly is preferably small in size. The subassembly includes a housing which has a central bore, a receiving opening for receiving fluid material into the central bore, and an exit opening through which fluid material exits the housing. A rotatable screw member is also provided in the pump subassembly. The screw member is an elongate, threaded member which is engaged through and supported within the housing in the central bore. In the preferred embodiment the screw member has a cone point which is positioned at an end adjacent the housing exit opening. Although the taper and number of threads per inch of the screw member may be specifically selected to accommodate the fluid material being metered, the screw member in the preferred embodiment is capable of applying a variety of fluid materials having different viscosities, and has taper of approximately 0.020 to 0.075 inches and approximately 7 to 12 threads per inch.

Intermediate the cone point of the screw member and the exit opening of the housing, an efficiency regulator is provided. The regulator is threaded into engagement with the second end of the housing, and includes an internal cone for mating engagement with the cone point of the screw member. The threaded engagement of the regulator with the housing permits adjustment of the regulator and the formation of a gap between the cone point of the screw member and the second end of the housing. The gap formed of the desired size creates an increase in pressure during operation of the metering pump subassembly. Increased back pressure is desirable where low volume and low viscosity fluid materials are pumped by the metering apparatus. The increase in pressure is caused by excess fluid accumulation in the gap flowing in the reverse direction from the screw member cone point to the central bore portion. This reverse flow ensures that the screw member is at all times completely filled with fluid material, and thus eliminates the collection of air within the central bore. The use of the regulator enables adjustment of the flow rate of fluid material depending on the viscosity of the fluid material and conduit lengths, and thereby permits efficiency optimization of the metering pump subassembly and metering apparatus of the present invention.

A driver is supported on and/or adjacent the housing and is engaged with the screw member for rotating the screw member within the central bore. The screw member supplies fluid material to the exit opening of the housing in specified amounts carried by the threads of the screw member. Upon exiting the housing via the exit opening, the fluid material is then directly applied to any desired surface, or, as in the illustrated embodiment, to a specified surface of extrudate material during an on-line coating operation. In the illustrated embodiments of the present invention, either single or multiple metering pump subassemblies may be provided to accomplish the desired task.

The reservoir subassembly illustrated includes a tank for maintaining the fluid material, and an agitator for agitating or stirring the fluid during operation of the apparatus in order to maintain the proper consistency of the fluid material for operation of the metering pump subassembly and application of the fluid material to the surface. The reservoir subassembly is preferably transportable between operating locations, with the metering pump subassembly attached thereto. The housing of the metering pump subassembly is secured to the tank in order to supply the metering pump subassembly with the necessary fluid material for operation at any desired location.

During operation of the metering apparatus, compressed air is provided to the driver to rotate the screw member. The screw member may be rotated by the driver within the central bore at between 1 and approximately 1,750 rpm where the driver is an air motor, and at between 1 and approximately 4,800 rpm where the driver is an electric motor. However, the preferred rotation rate is established depending on the viscosity of the fluid material being metered, and the desired flow rate for application of the fluid material. As an example, in the case of an adhesive material such as Versicote® III, the screw member is operated at a speed of approximately 1,750 rpm. At this operation rate, fluid material exits the exit opening of the housing to the desired surface at a flow rate of approximately 14 grams/min. However, depending on the fluid material being applied, the desired flow rate may range from approximately 1 to 23 grams/min.

Application of the desired amount of fluid material may additionally be controlled with the present invention by increasing or decreasing the flow rate at which the fluid material is applied. By increasing or decreasing the speed or flow rate of the driver, the amount of fluid material provided to the exit opening is varied, and thus provided to the desired surface in a layer of fluid material having a thickness of approximately 0.001 to 8 mils. Additionally, the use of the screw member of the present invention avoids plugging or clogging of the central bore, since the continuous operation of the screw member serves to self-clean the bore, and also provides fluid material continuously, without pulsing the flow from the exit opening.

Other features and advantages of the present invention will become apparent from the following detailed description of the preferred embodiments made with reference to the accompanying drawings, which form a part of the specification.

BRIEF DESCRIPTION OF THE DRAWINGS

FIGS. 9 and 10 are cross-sectional views of a die taken along the line 9—9 of FIG. 8, where FIG. 10 shows fluid material being applied to a specific surface of an extrudate;

FIG. 12 shows the fluid material applied to specific surfaces of the extrudate.

DETAILED DESCRIPTION OF THE PREFERRED EMBODIMENT

Figure 1B:
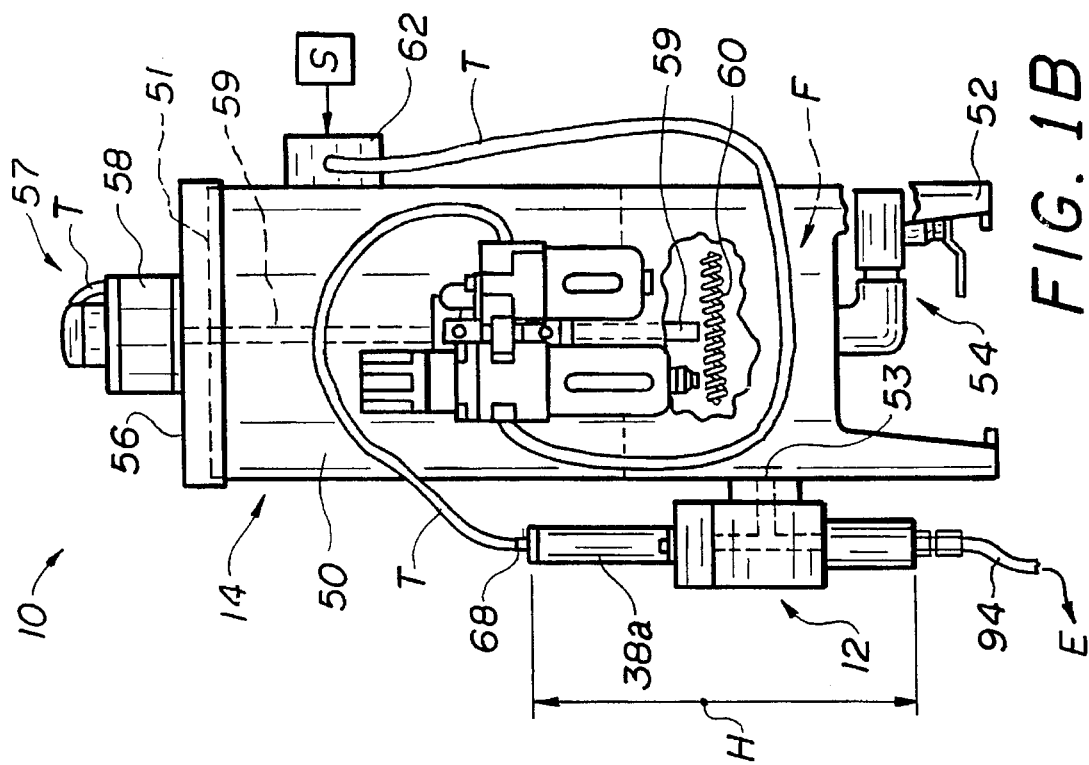
FIGS. 1A, 1B and 1C are schematic, partially cut-away, front, side and top views, respectively, of a metering apparatus constructed in accordance with the present invention.
Figure 1A:
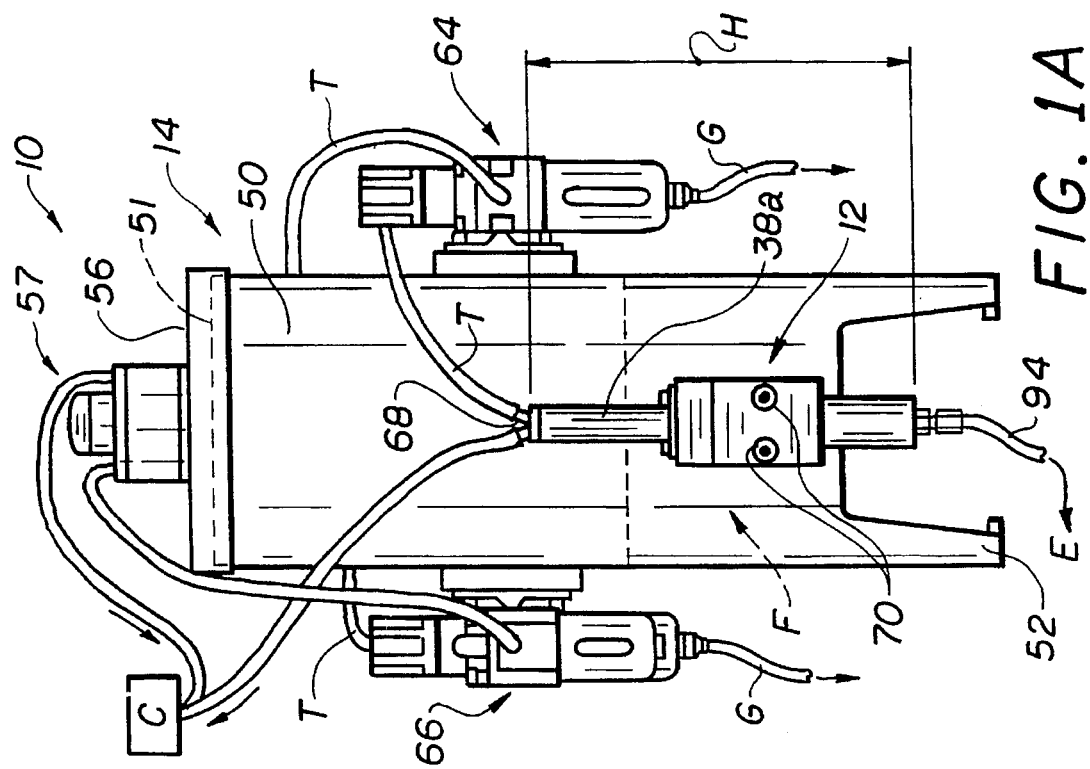
Figure 1C:
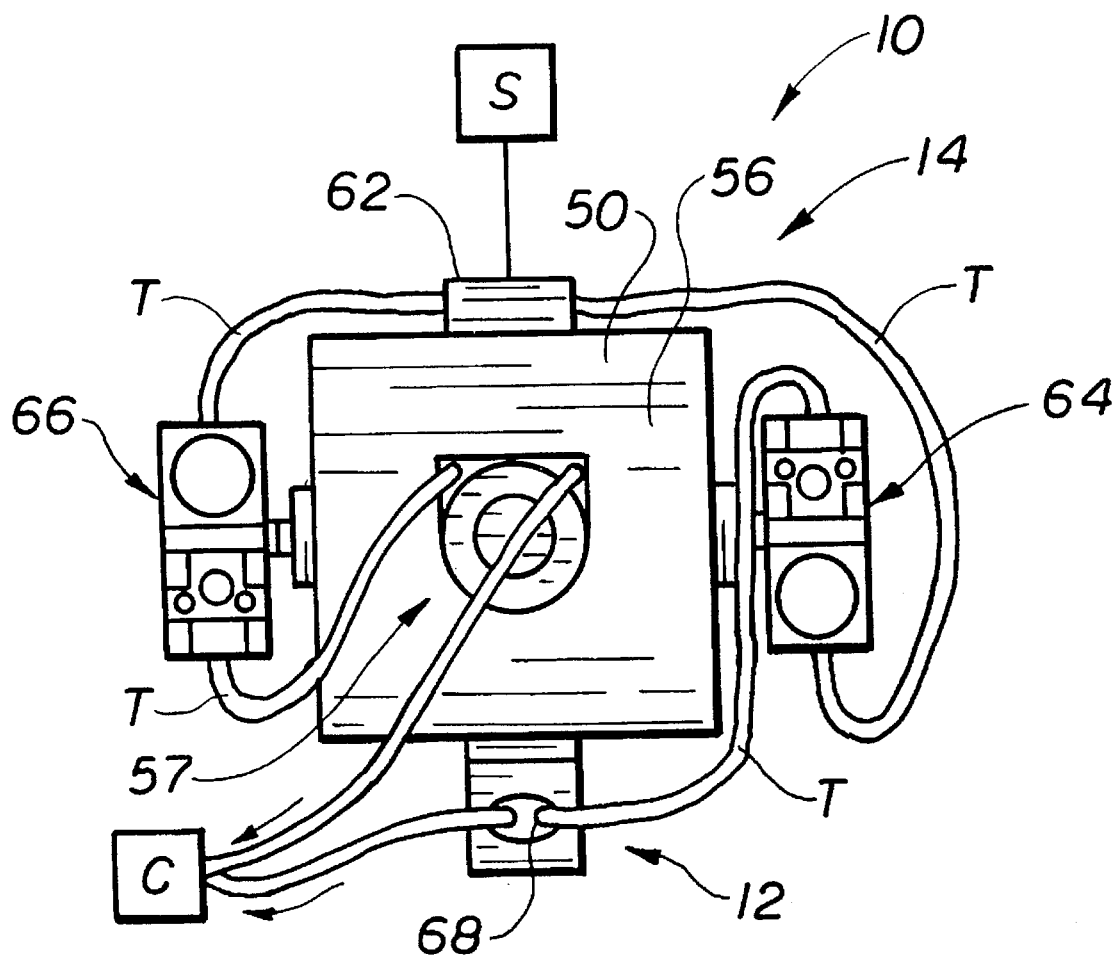

FIGS. 1A, 1B and 1C illustrate a metering apparatus of the present invention for applying a desired amount of fluid material F which may be of any rheological characteristic, to a specified location. It shall be understood that the term fluid material shall include materials such as suspensions, solutions, mastics, caulks, sealants and the like. The metering apparatus, generally referred to at reference numeral 10, preferably includes a metering pump subassembly 12 and a reservoir subassembly 14.

Figure 4:
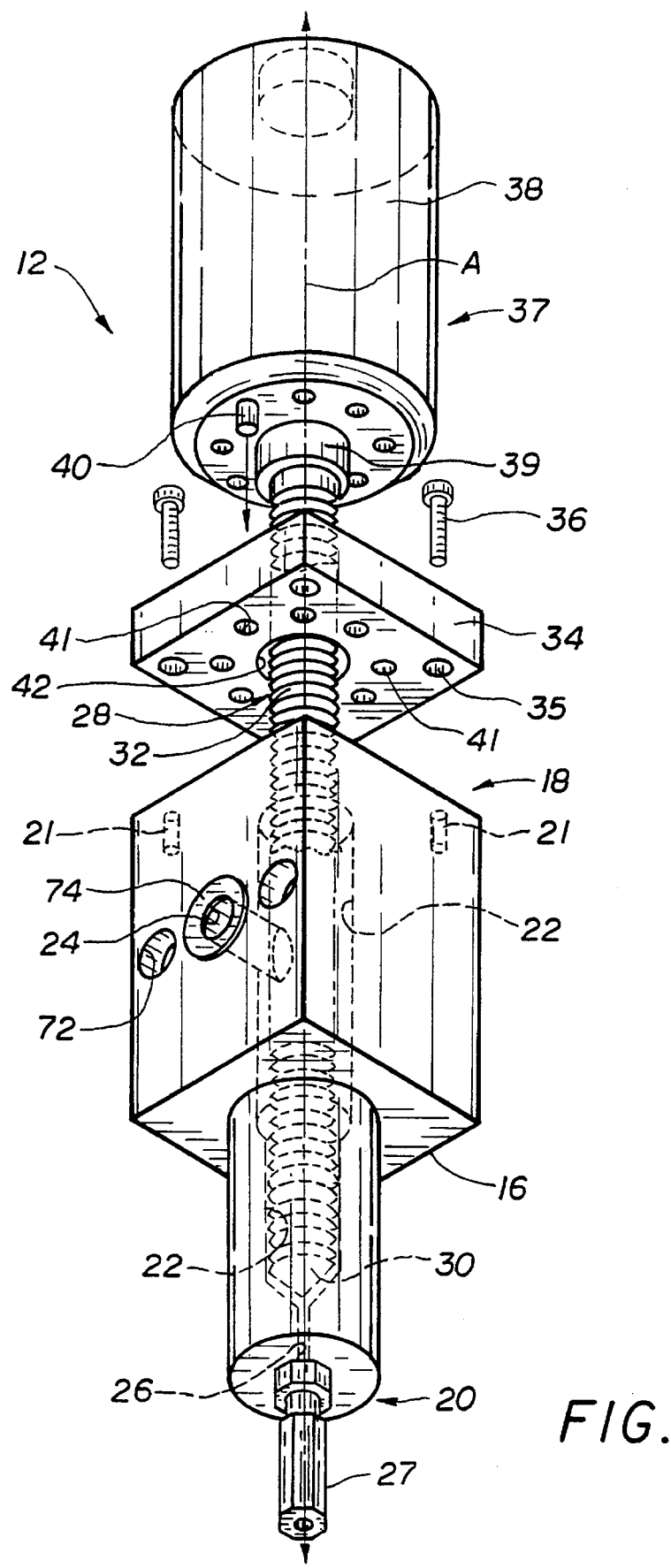
FIG. 4 is an exploded, schematic view of a metering pump subassembly of the metering apparatus of the present invention.

The metering pump subassembly 12 of the present invention, as illustrated in FIG. 4, includes a housing 16. The housing 16 has first and second ends 18, 20 and openings 21 formed in the first end of the housing. A central bore portion 22 is provided which extends through the housing between the first and second ends 18, 20. The bore portion has a central axis A. A receiving opening 24 is provided adjacent the first end 18 of the housing for receiving fluid material into the central bore portion 22. An exit opening 26 through which fluid material exits the housing is also provided at the second end of the housing. A cap plate 34 is additionally provided for supporting engagement with the first end 18 of the housing 16. The cap plate 34 includes openings 35 through which threaded fasteners 36 are engaged into the openings 21 formed in the first end 18 of the housing, to thereby maintain the cap plate 34 engaged with the housing 16.

The first end of the housing engaging the cap plate 34 has a substantially rectangular configuration, while the second end of the housing has a substantially cylindrical configuration. A fitting 27 may be provided at the second end of the housing engaged with the exit opening for engagement with an additional conduit 94 or other means by which the fluid material is either directly or indirectly transferred to the desired surface location. The housing and cap plate are manufactured of 316 stainless steel.

A rotatable screw member 28 of the pump subassembly is engaged through the housing 16 within the central bore portion 22. The screw member 28 is manufactured of stainless steel and is an elongate, threaded member which is engaged through and supported within the housing in the central bore portion 22, aligned with the central axis A. In the illustrated embodiment the screw member 28 has a cone-shaped point 30 which is positioned at an end of the screw member adjacent the second end 20 of the housing 16. The diameter of the screw member 28 is preferably of a size slightly smaller than the diameter of the central bore portion 22. Additionally, although the taper of the screw member threads 32 and the number of threads per inch of the screw member may be specifically selected to accommodate the fluid material being metered, the screw member in the preferred embodiment is capable of applying a variety of fluid materials having different viscosities. In the preferred embodiment, the taper of the screw member threads is approximately 0.020"–0.075". Additionally, the spacing of the preferred screw member threads is approximately 7–12 threads per inch.

Figure 5:
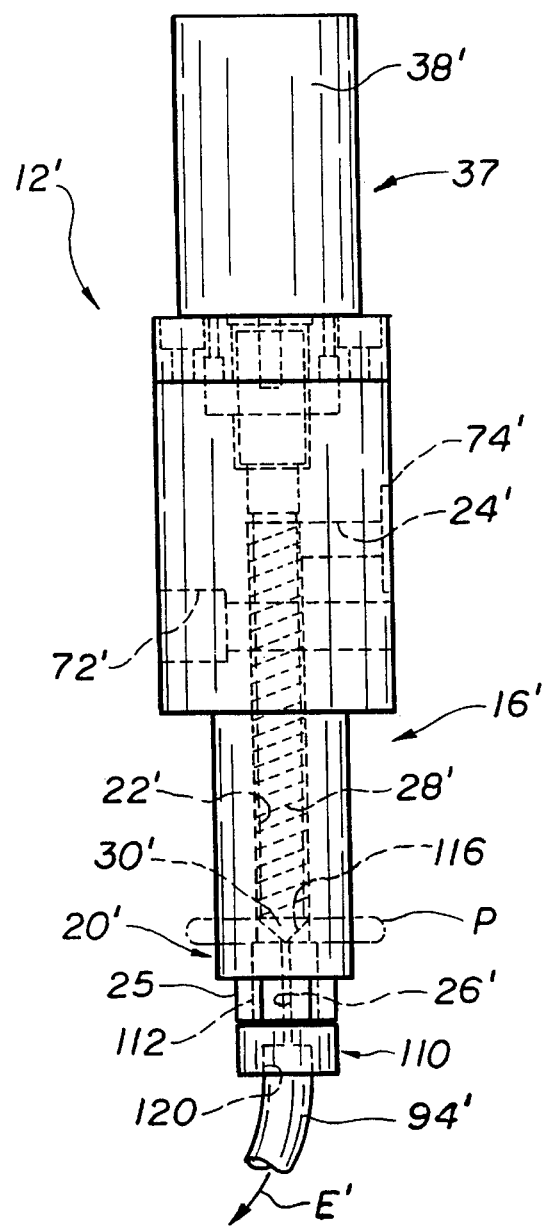
FIG. 5 is a partial side view of a metering pump subassembly of the metering apparatus of the present invention.
Figure 6:
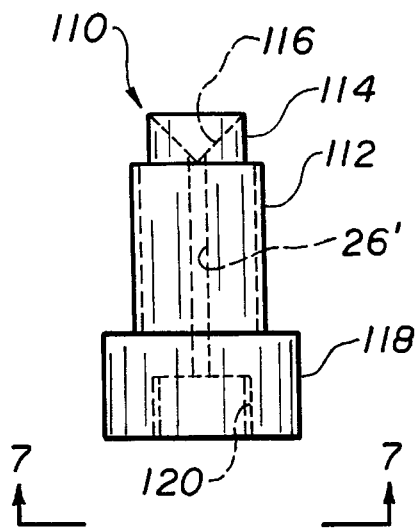
FIG. 6 is a side view of an efficiency regulator of the type shown in the subassembly of FIG. 5.
Figure 7:
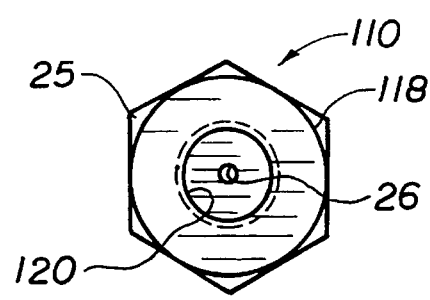
FIG. 7 is an end view of an efficiency regulator taken along the line 7—7 of FIG. 6.

As shown in FIGS. 5–7 in an alternate modification and preferred embodiment of the metering pump subassembly 12' of the present invention, an efficiency regulator 110 is provided which is supported on the housing 16'. As this alternate embodiment of the metering pump subassembly 12' has components substantially similar to those previously described, the similar components will be referred to using the same reference numerals, but with a single prime designation. Only the differences between this modified embodiment and the previously described embodiment will be discussed in further detail. The regulator 110 is supported on the housing 16' in threaded engagement with the second end 20' of the housing. In this preferred embodiment of the invention, the second end 20' of the housing 16' is provided with a hex shape for engagement by a wrench or other conventional rotational adjustment tool to secure the regulator threaded fixed lock nut 25 having an internal threaded diameter larger than that of the central bore portion 22'. The exit opening 26' is provided within the regulator 110. An intermediate portion 112 of the regulator is externally threaded for engagement with the threaded lock nut 25. A first end portion 114 regulator has a diameter smaller than that of the intermediate portion 112, and includes an internal cone 116 for mating engagement with the cone point 30' of the screw member 28'. A second end portion 118 of the regulator has a rounded configuration. The second end portion 118 of the regulator includes adapter exit 120. As shown in FIGS. 5 and 6, the adapter exit 120 is in fluid communication with the exit opening 26'. The adapter exit 120 includes internal threads for engagement with a conduit 94' for supplying fluid material, or alternatively with a fitting 27 for engagement with a conduit.

The threaded engagement of the regulator 110 within the housing 16' permits rotation of the regulator 110 and the formation of an opening P between the cone point 30' of the screw member 28' and the internal cone 116 as shown by the circle in FIG. 5. The opening P is adjusted to the desired size in order to create the desired level of back pressure during operation of the metering pump subassembly 12'. Depending on the size of the opening P, excess fluid material accumulates in the opening, which flows in a reverse direction from the screw member cone point 30' toward the central bore portion 22'. This reverse flow ensures that the threads of the screw member 28' are at all times completely filled with fluid material F. Where the threads are filled with fluid material, air cannot collect and result in air in the fluid material provided to the extrudate E. The elimination of air in the fluid material avoids undesirable pulsing in the flow of fluid material and eliminates any air bubbles in the fluid material. The regulator may be used as a fine adjustment of the flow rate to optimize the efficiency of the metering pump subassembly.

Further, a driver 37 is engaged with the screw member 28 for rotation thereof within the central bore portion in order to provide fluid material from the housing 16 via the exit opening 26 at a variable flow rate. In the preferred embodiment illustrated in FIGS. 4–5, the driver 37 is an electric motor 38. The preferred electric motor is manufactured by Micro Mo Electronics Inc. Alternatively, in the embodiment illustrated in FIGS. 1A–1C, the driver 37 is an air motor 38a. The preferred air motor 38a is manufactured by Micro Motor Inc. As the embodiments of the invention using either the electric motor 38 or the air motor 38a are substantially similar, only the differences resulting from the use of one device over the other will be discussed in further detail. The drive shaft of the motor 38, 38a is interconnected with an end of the screw member 28 spaced from the cone point 30 at a neck ring 39. The neck ring 39 is positioned to engage and be supported during rotation by the cap plate 34. The cap plate engages the neck ring 39 at a central opening 42 which has a central axis aligned with the central axis A of the central bore portion 22.

Additionally, the cap plate is provided with centering openings 41, to permit alignment of the motor 38, 38a with the cap plate 34 and housing 16. As shown in FIG. 4, a centering member 40 is provided on the motor to engage the centering openings 41 and center the motor. When properly positioned, the centering member 40 is engaged within an appropriate centering opening 41 in the cap plate 34. As shown in FIGS. 1A and 1B, the height of the metering pump subassembly H is preferably approximately 9 inches.

Figure 13:
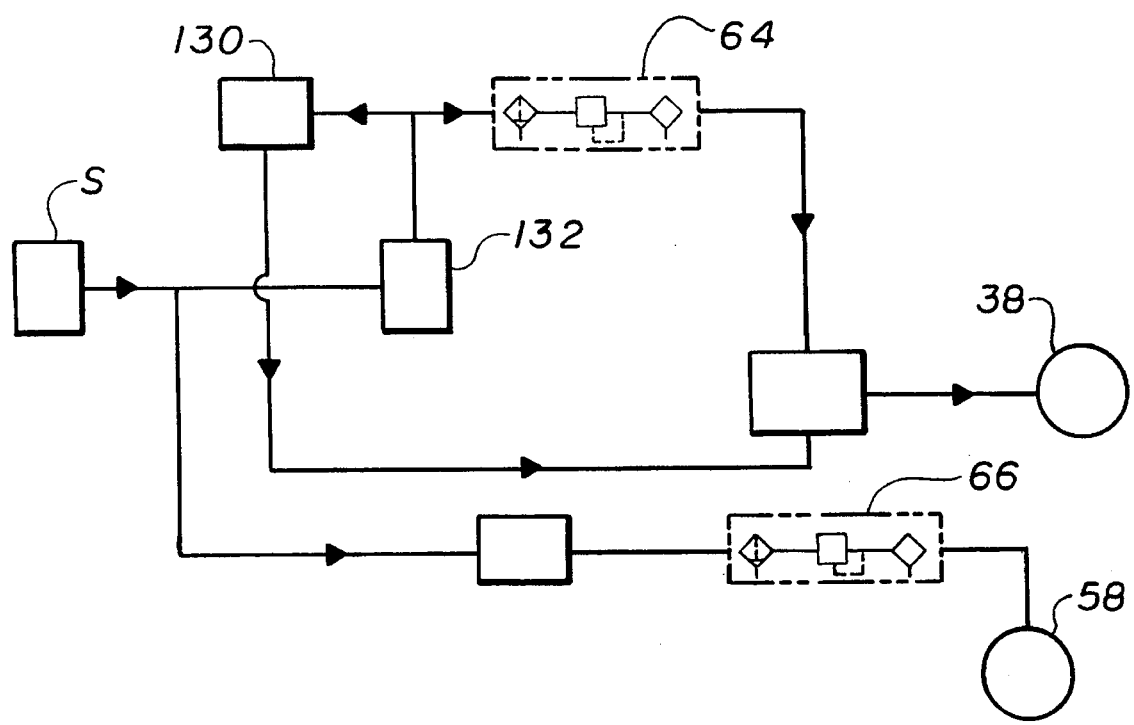
FIG. 13 is a schematic representation of the pneumatic control system of the apparatus of the present invention having an air motor in the metering pump subassembly.

As shown in FIG. 13, a low pressure starter 130 is provided for starting the embodiment of the invention using an air motor 38a. The use of the starter 130 is preferred, since the air pressure required to operate the air motor is less than that required to start the air motors. The starter eliminates the need to increase the air supply pressure for starting the air motors, and thereafter reduce the air supply pressure to the desired operating pressure. Instead, upon operation of a switch 132 of the controller C, a 100 millisecond pulse of full pressure air is provided to start the air motor operation. The switch 132 then returns the air pressure supplied to the desired low level operating pressure.

The reservoir subassembly 14 of the illustrated invention includes a tank 50. The tank has an open top 51, and is a gravity feed tank. The tank 50 may be of any size, but is preferably large enough to maintain a supply of fluid material F, but which is readily portable, such as 1½ to 2 gallons. The tank is preferably manufactured of cold rolled, chrome plated steel. As shown in FIGS. 1A and 1B, the tank includes legs 52, and has a drain 54 positioned at the bottom of the tank 50. Additionally, a lid 56 is provided to cover the open top 51 of the tank.

An agitator 57, supported on the tank lid 56, is also provided for continuously stirring the fluid material within the tank in order to maintain the proper consistency of the fluid material prior to application to the desired surface or location. The agitator 57 includes an air motor 58, an elongate shaft 59 and a stir portion 60. The rotatable drive shaft of the air motor 58 is interconnected with the shaft 59. The preferred air motor 58 is a ⅓ HP motor manufactured by GAST Manufacturing Corp.

As shown in FIG. 1B, the stir portion 60 is interconnected with the shaft 59 at an end spaced from the air motor 58, and is positioned within the tank whereby upon operation of the air motor and rotation of the stir portion 60, continuous mixing of the fluid material is provided.

It should be understood by one of ordinary skill that both the air motor 38a of the metering pump subassembly 12, and the air motor 58 of the reservoir subassembly 14 are driven by compressed air. The compressed air is preferably supplied via a conventional manufacturing plant supply S to a manifold or conventional valve 62 positioned on the tank 50. The compressed air is then supplied to the air motors 38a, 58 by conduit T, and preferably at a rate of approximately 5 ft³/min.

Prior to being supplied to the air motors 38a, 58, the compressed air is provided, also by conduits T, to a conventional "FRL," or filter/regulator/lubrication device, generally referenced in FIGS. 1A–1C at reference numerals 64, 66. The preferred FRL's are manufactured by SMC Pneumatics, Inc. The FRL's filter the compressed air, regulate the pressure at which the supply is provided to the air motors and add lubrication to the air to reduce deterioration of the subassembly. Water or dirt filtered from the compressed air exit the FRL via a conduit G.

After passing through the FRL's 64, 66, the compressed air is provided to an input 68 to operate the air motors 38, 58. Each of the air motors 38, 58 is additionally interconnected with a system controller C, which may be used to control the speed of operation of the motors, and thus the flow rate of the fluid material exiting the metering apparatus 10.

It should further be understood that in the embodiment of FIG. 4 using an electric motor 38, the controller C of the present invention enables the use of a hold position during operation of the metering pump subassembly. When the hold position is desired and activated, using a switch within the controller C, the rotational direction of the electric motor 38 is reversed. When the electric motor 38 is temporarily reversed, the reversal of the rotational direction eliminates dripping of the fluid material. For example, a 20 rpm motor reversal eliminates dripping of Versicote® III in the metering pump subassembly 12 of the present invention. The use of the controller C of the present invention may also be useful in monitoring the power used by the apparatus. In the event a change occurs in power usage, possibly indicating the evaporation of fluid material, or a change in viscosity of the fluid material, necessary adjustments may then be made to maintain the desired composition of the fluid material. Additionally, the controller enables closed loop feed back, such that the controller monitors and adjusts the power supplied to the system to precisely maintain the desired electric motor rpm. The controller C may be a conventional programmable microprocessor unit. Alternatively, manual setting of the electric motors is possible.

As shown in FIG. 1B, the metering pump subassembly 12 is secured to the tank at a location covering an opening 53 formed in a wall of the tank 50. As shown in FIGS. 1B and 4, the housing 16 is secured to the tank 50 via fasteners 70 engaged with the housing through openings 72 formed in the housing. Additionally, the receiving opening 24 is in communication with the opening 53 formed in the tank, and the central bore portion 22 to provide fluid material directly from the tank 50 to the housing 16. Fluid material is prevented from leaking during transfer from the tank to the housing by a seal ring 74 surrounding the receiving opening 24.

During operation of the metering apparatus 10 illustrated in FIGS. 1A–1C, the air motor 38a operates at between 1 and approximately 1,750 rpm. During operation of the metering pump subassembly illustrated in FIG. 4, the electric motor 38 operates at between 1 and approximately 4,800 rpm. Operation at these levels results in a flow rate of fluid material from the metering pump subassembly at between 1 and 23 grams/min., and at the preferred rate of approximately 14.7 grams/min. In the event faster or slower flow rates are required to accommodate a specific fluid material, adjustment may be made to the controller C to speed or slow the motor 38, 38a as may be necessary. The metering pump subassembly of the present invention is a precision pump due to the capability of applying such small amounts of fluid material in such precise desired locations.

Testing of the present invention using fluid materials having specific viscosities was conducted using a subassembly having an electric motor 38 under the following conditions: The controller C used was an Intex brand closed loop unit. The screw member 28 used had a diameter of 0,375 inches with a tapered thread depth of between 0.020 and 0.012 inches. The supply conduit 94 for the fluid material had an internal diameter of 1/16 inch, and was 16 ½ inches in length. The fluid level within the tank 50 was maintained at 64 fluid ounces during all test runs. The apparatus was run for 15 minutes at each speed setting before starting each test. During each test a one minute weight sample and a one minute volume sample were taken at the speed indicated. The results were as follows:

| Test Material | Speed 1 650 rpm | Speed 2 1300 rpm | Speed 3 1950 rpm |
| --- | --- | --- | --- |
| Water | | | |
| g/min | 4.4/4.3/4.4 | 10.3/10.3/10.2 | 16.4/16.1/16.3 |
| cc/min | 4.2/4.2 | 10.4/10.4 | 16.2/16.4 |

-continued

| Test Material | Speed 1 650 rpm | Speed 2 1300 rpm | Speed 3 1950 rpm |
| --- | --- | --- | --- |
| Corn Syrup | | | |
| g/min | 6.2/6.6/6.6 | 13.9/13.7/13.7 | 22.3/22.6/22.7 |
| cc/min | 5.5/5.4 | 10.6/10.3 | 17.0/16.8 |
| Salad Dressing | | | |
| g/min | 4.5/4.4/4.4 | 9.3/9.4/9.3 | 14.7/14.7/14.5 |
| cc/min | 4.3/4.2 | 9.4/9.4 | 14.2/14.4 |

Figure 2:
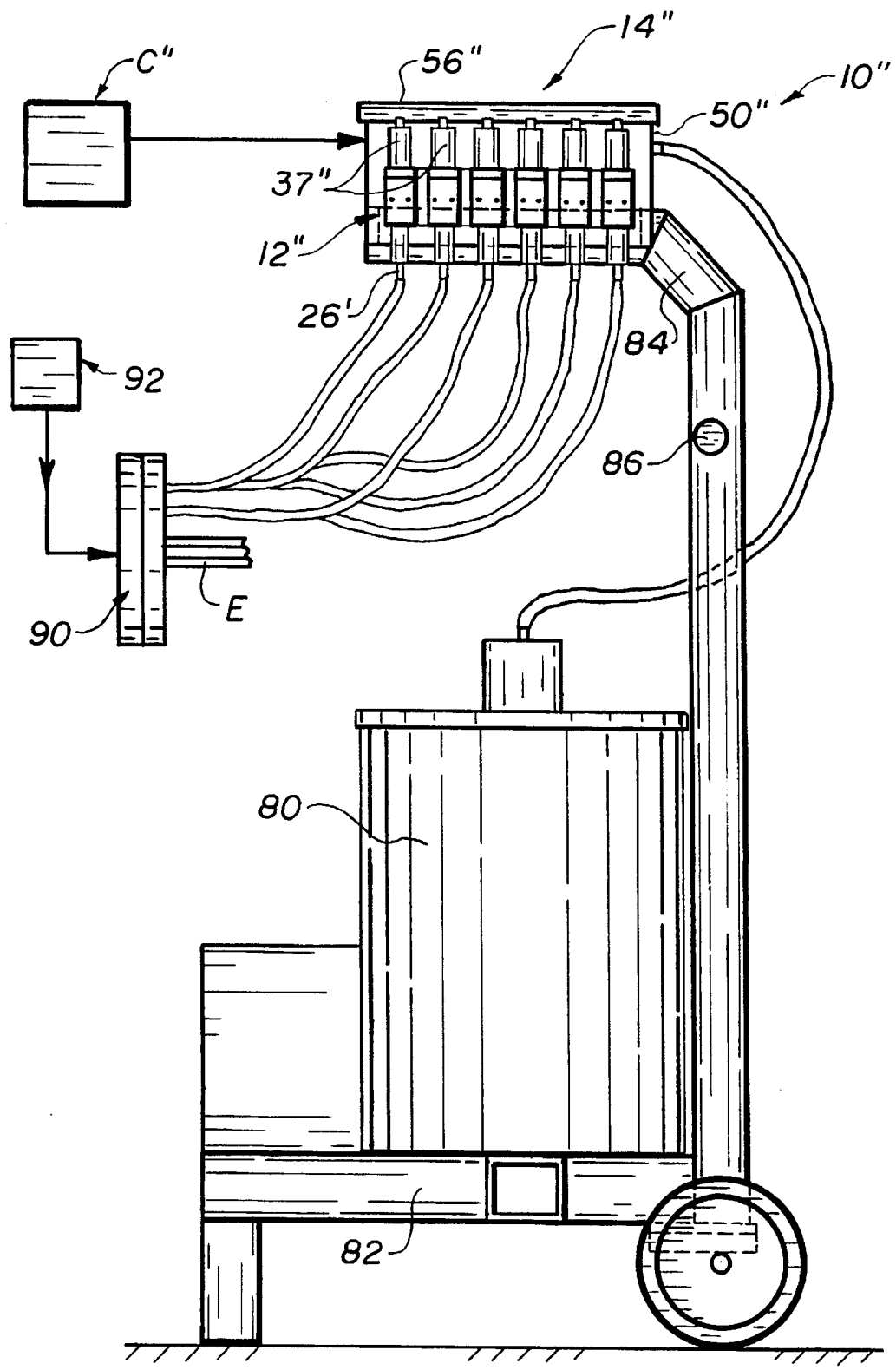
FIG. 2 is a schematic side view of an alternate embodiment of a metering apparatus constructed in accordance with the present invention.
Figure 3:
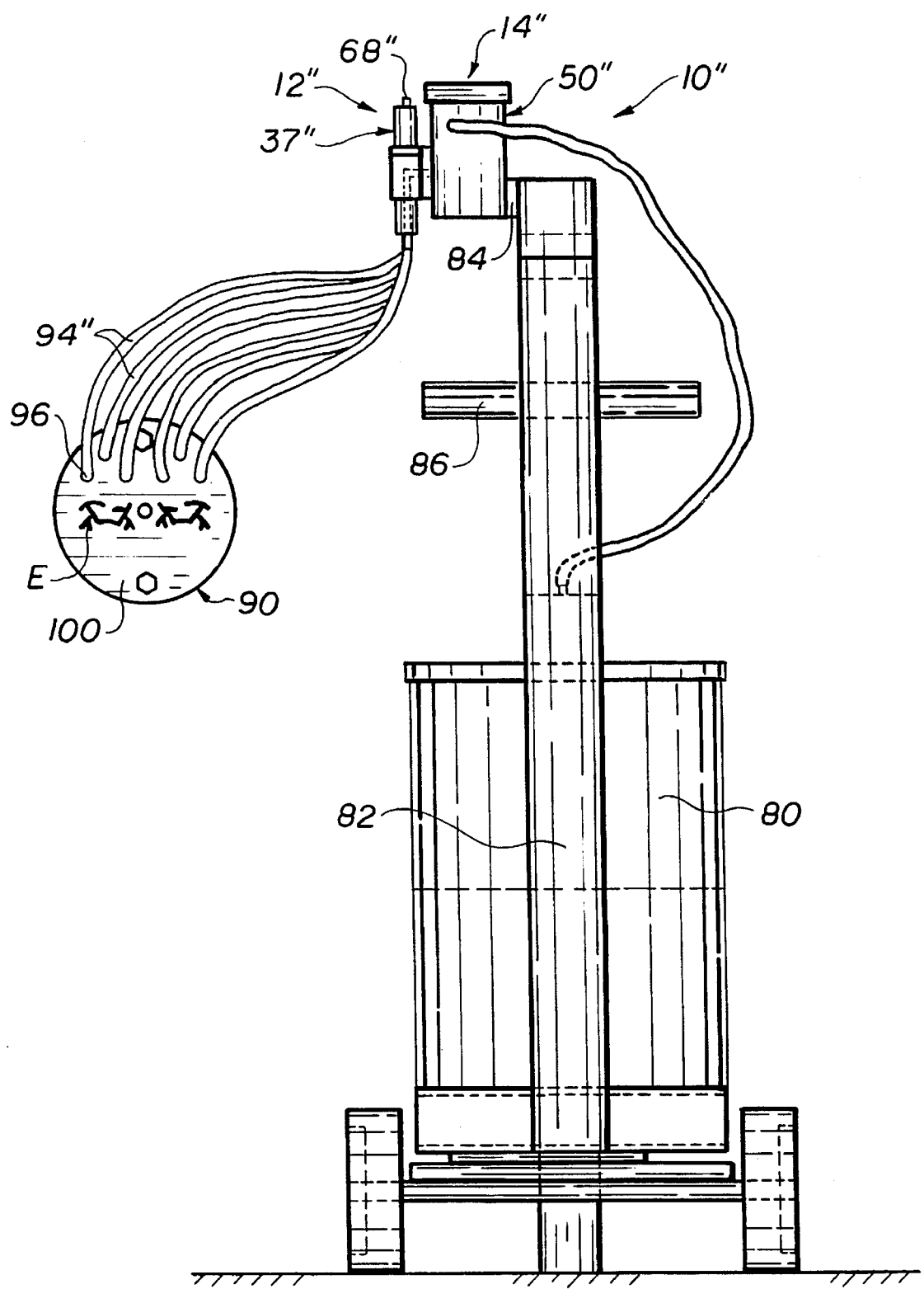
FIG. 3 is a schematic rear view of the apparatus of FIG. 2 showing the application of fluid material to an extrudate material during extrusion from a die.

In a still further embodiment of the invention illustrated in FIGS. 2 and 3, multiple metering pump subassemblies 12" are provided and secured to a reservoir subassembly. As this alternate embodiment of the metering apparatus 10" has components substantially similar to those previously described, the similar components will be referred to using the same reference numerals, but with a double prime designation. Only the differences between this alternate embodiment and the previously described embodiments will be discussed in further detail.

In the embodiment of FIGS. 2 and 3, six (6) metering pump subassemblies 12" are engaged with a reservoir subassembly 14". The drivers 37" of the metering pump subassemblies 14" are controlled via the controller C" schematically shown in FIG. 2 As the metering pump subassemblies 12" may be identical to the devices illustrated in either FIGS. 1A–1C and 4, these subassemblies are not discussed further.

The reservoir subassembly 14" of FIGS. 2 and 3, includes a tank 50" which is supplied with additional fluid material from a reserve tank 80 via a conduit. The reserve tank is supported on a wheeled frame cart 82. The tank 50" is supported on an arm 84 of the cart 82. Handles 86 are mounted on the cart to enable easy movement of the cart to the desired location.

In the schematic illustration of FIGS. 2 and 3, an extrusion die 90 is additionally provided, which is shown schematically interconnected with an extruder device 92. In FIG. 2 the schematic, extrudate material E is shown exiting the die 90. Additionally, each of the exit openings 26" of the metering pump subassemblies 12" is shown interconnected with the die via the conduit 94". FIG. 3 schematically illustrates the face of the die 90, and the cross-sectional configuration of the extrudate material being extruded. Additionally, FIG. 3 illustrates the interconnection between the conduits 94" supplying fluid material from the metering pump subassemblies 12" to supply openings 96 in the die 90.

Figure 8:
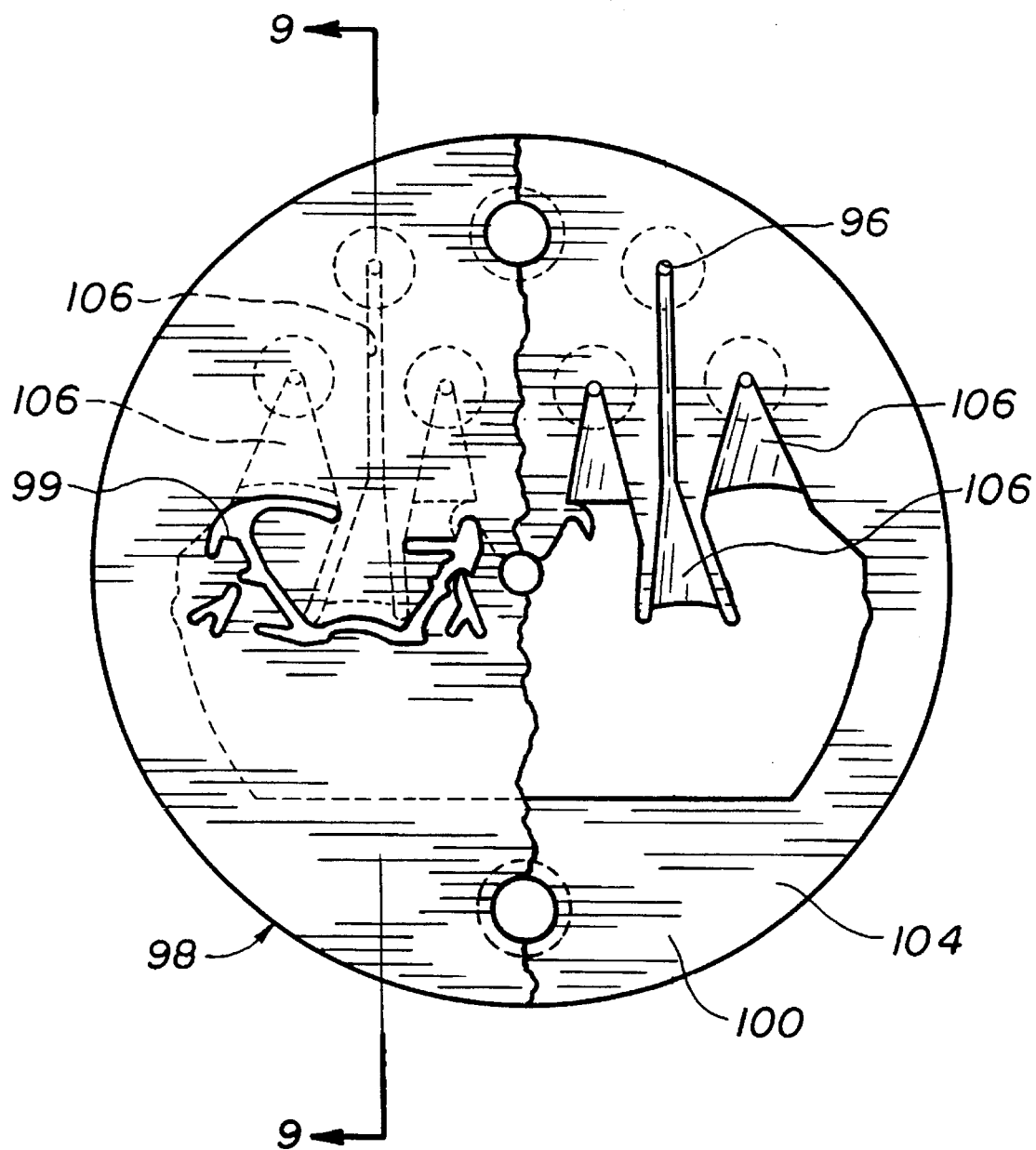
FIG. 8 is a schematic, cut-away, rear view of a die for use in application of fluid material to an extrudate.

As further illustrated in FIGS. 8–10, the die 90 consists of a rear plate 98 having a die opening 99 with the cross-sectional configuration of the extrudate material which engages extrudate material directly from the extruder 92. Additionally, a front plate 100 is provided. A rear view of the front plate 100 is shown in FIG. 8. The front surface 102 of the front plate includes the supply openings 96 for engagement with the conduits 94". The rear surface 104 of the front plate includes passages 106, which supply the fluid material directly to the surface of the extrudate material which is to be provided with material. It should be understood that the single metering pump subassembly 12, 12" may be substituted for the multiple subassemblies illustrated, so that a single conduit 94, 94' supplies multiple conduits 94" engaged with the supply openings 96.

Figure 11:
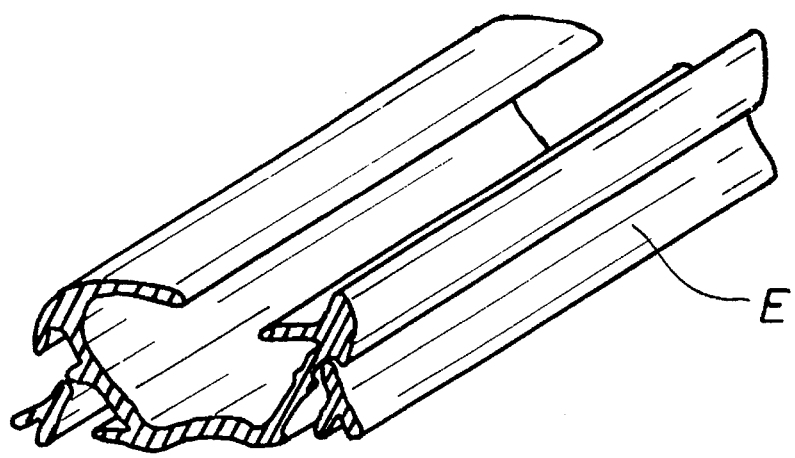
FIGS. 11 and 12 are perspective views of an extrudate, where
Figure 12:
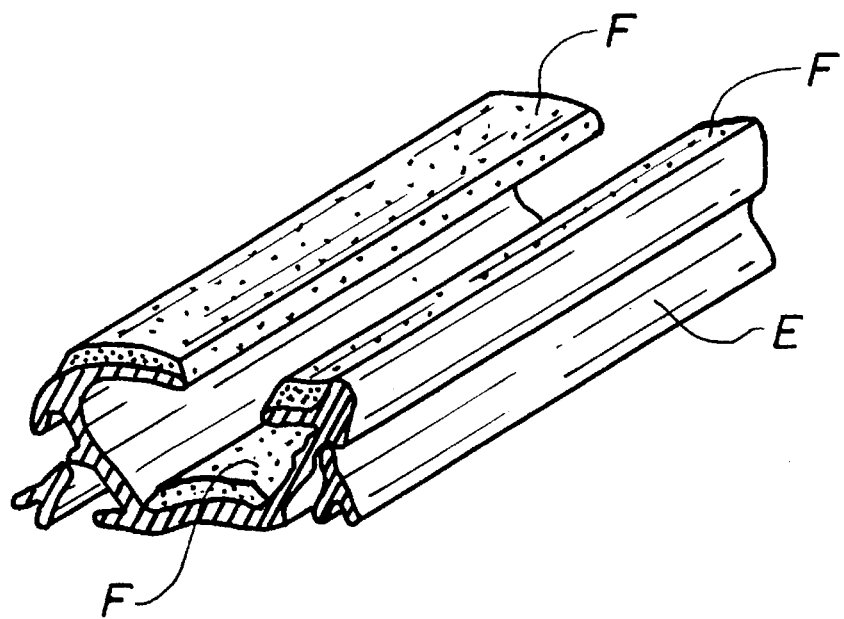

The relationship between the plates 98, 100 and passages 106 is more clearly illustrated in the cross-sectional views of FIGS. 9 and 10. During extrusion of the extrudate material E, by supplying fluid F to the supply openings 96, fluid material is additionally provided to the passages 106 and deposited on specific surfaces of the extrudate E after it passes through the die opening 99. An extrusion without fluid material is illustrated in FIG. 11, while an extrusion having fluid material F deposited on specific surfaces is illustrated in FIG. 12.

The preferred form of each embodiment in FIGS. 1A–C, 4, and 5 of the invention described here is configured to avoid plugging and clogging of the metering pump subassembly. Such self-cleaning of the subassembly is provided, since the continuous rotation of the screw member 28, 28' by the driver 37 continuously clears the central bore portion 22, 22' of any residual fluid material.

The metering apparatus of this invention has been described above. However, with the present disclosure in mind it is believed that obvious alterations to the preferred embodiment, to achieve comparable features and advantages in other assemblies, will become apparent to those of ordinary skill in the art.

We claim:

1. A metering apparatus for continuously supplying a specified amount of liquid materials from a reservoir, said metering apparatus comprising, a housing having a central bore therethrough, a receiving opening for receiving liquid material to said central bore and an exit opening through which liquid material exits said housing, a rotatable screw member engaged through said housing within said central bore, a driver supported adjacent said housing and engaged with said screw member for rotation thereof within said bore to continuously supply liquid material from said exit opening at a variable flow rate of between approximately 1 to 23 grams/min. independent of the viscosity of the liquid material provided, and said housing further includes an efficiency regulator engaged with said housing at a location adjacent said screw member, said exit opening is formed in said efficiency regulator for permitting liquid material to exit said housing, and wherein said efficiency regulator is adjustable for varying the distance provided between said efficiency regulator and said screw member to thereby adjust the efficiency of said metering apparatus.

2. A metering apparatus for continuously supplying a specified amount of liquid material, said metering apparatus comprising, a reservoir subassembly for holding a supply of liquid material to be supplied by said metering apparatus, a metering subassembly having a housing including a central bore therethrough, a receiving opening for receiving liquid material from said reservoir to said central bore, and an exit opening through which liquid materials exits said housing, said metering subassembly further includes a rotatable screw member engaged through said housing within said central bore, said metering subassembly further including a driver supported adjacent said housing and engaged with said screw member for variable rotation thereof within said bore to continuously supply liquid material to said exit opening at variable flow rates, and said metering subassembly housing further includes an efficiency regulator engaged with said housing at a location adjacent said screw member, for permitting liquid material to exit said housing, and wherein said efficiency regulator is adjustable for varying the distance provided between said efficiency regulator and said screw member to thereby adjust the efficiency of said metering apparatus.

3. The apparatus of claim 1, wherein said reservoir subassembly is transportable between operating locations and said housing of said metering subassembly is secured to said transportable reservoir subassembly.

4. The apparatus of claim 1, wherein said reservoir subassembly includes a tank for maintaining liquid material, a motor for agitating said liquid material during operation of said metering apparatus, and said metering subassembly housing is secured adjacent said tank to provide said liquid material from said tank to said receiving opening.

5. The apparatus of claim 1, wherein said driver is an electric motor and said screw member is rotated by said electric motor within said central bore at between 1 and approximately 4,800 rpm.

6. The apparatus of claim 1, wherein said driver is an air motor and said screw member is rotated by said air motor within said central-bore at between 1 and approximately 1,750 rpm.

7. The apparatus of claims 5 or 6, wherein liquid material is supplied at a flow rate of between approximately 1 and 23 grams/min.

8. The apparatus of claim 6, wherein said air motor is supplied with compressed air having a pressure of approximately 90 psi, which during operation of said driver at between 1 and approximately 1,750 rpm, uses compressed air at a rate of approximately 5 ft$^3$/min.

9. The apparatus of claim 8, further comprising a low air pressure starter for said air motor.

10. The apparatus of claim 7, wherein said screw member has a cone point at an end adjacent said exit opening, and approximately 7–12 threads per inch.

11. The apparatus of claim 7, wherein said liquid material is provided to said exit opening to apply a layer of liquid material having a thickness of approximately 0.001 to 8 mils.

* * * * *